United States Patent
Bystrov et al.

(10) Patent No.: US 8,000,508 B2
(45) Date of Patent: Aug. 16, 2011

(54) USER INTERFACE FOR MOTION ANALYSIS IN KINEMATIC MR STUDIES

(75) Inventors: Daniel Bystrov, Hamburg (DE); Vladimir Pekar, Hamburg (DE); Kirsten Meetz, Hamburg (DE); Thomas Netsch, Hamburg (DE); Stewart Young, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 1060 days.

(21) Appl. No.: 11/814,406

(22) PCT Filed: Jan. 5, 2006

(86) PCT No.: PCT/IB2006/050042
§ 371 (c)(1), (2), (4) Date: Jul. 20, 2007

(87) PCT Pub. No.: WO2006/079933
PCT Pub. Date: Aug. 3, 2006

(65) Prior Publication Data
US 2008/0069418 A1    Mar. 20, 2008

Related U.S. Application Data

(60) Provisional application No. 60/648,033, filed on Jan. 28, 2005.

(51) Int. Cl.
*G06K 9/00* (2006.01)
(52) U.S. Cl. .................................................. 382/128
(58) Field of Classification Search ............... None
See application file for complete search history.

(56) References Cited

U.S. PATENT DOCUMENTS

| 6,421,551 | B1 | 7/2002 | Kuth et al. |
| 6,556,008 | B2 | 4/2003 | Thesen |
| 7,106,891 | B2* | 9/2006 | Wyman et al. ............ 382/128 |
| 7,130,457 | B2* | 10/2006 | Kaufman et al. ......... 382/128 |
| 2003/0100826 | A1 | 5/2003 | Savelainen |

OTHER PUBLICATIONS

Pan et al., 4D-CT imaging of a volume influenced by respiratory motion on multi-slice CT, Feb 2004, Med. Physic. 31.*
Arun, K. S., et al.; Least-Squares Fitting of Two 3-D Point Sets; 1987; IEEE Trans. on Pattern Analysis; PAMI-9(5) 698-700.
Bystrov, D., et al.; Motion Compensation and Plane Tracking for Kinematic MR-Imaging; 2005; CVBIA; vol. 3765; pp. 551-560.
De Graaf, F. A.; The Panorama 1.0T open MR system; 2004; MedicaMundi; 48(3)36-43.

(Continued)

*Primary Examiner* — Vu Le
*Assistant Examiner* — Claire X Wang

(57) ABSTRACT

In a diagnostic imaging system (10), a user interface (82) facilitates viewing of 4D kinematic data sets. A set of reference points is selected in a first 3D image to designate an anatomical component. An algorithm (104) calculates a propagation of the selected reference points from the first 3D image into other 3D images. Transforms which describe the propagation of the reference points between 3D images are defined. An aligning algorithm (112) applies inverse of the transforms to the 3D images to define a series of frames for the video processor (120) to display, in which frames the designated anatomical component defined by the reference points in each of the 3D images remains fixed while the other portions of the anatomical region of interest move relative to the fixed designated anatomical component.

19 Claims, 2 Drawing Sheets

OTHER PUBLICATIONS

Hodge, D. K., et al.; Dynamic MR Imaging and Stress Testing in Glenohumeral Instability: Comparison with Normal Shoulders and Clinical/Surgical Findings; 2001; J. MRI; 13:748-756.

Kabus, S., et al.; B-Spline Registration of 3D Images with Levenberg-Marquardt Optimization; 2004; SPIE Medical Imaging; vol. 5370; pp. 304-313.

McNally, E. G., et al.; Assessment of patellar maltracking using combined static and dynamic MRI; 2000; Eur. Radiol.; 10:1051-1055.

Ma, X., et al.; Active MR Tracking Using an External Tracking Coil at 0.2 T for Scan Plane Registration During Kinematic Imaging of Moving Joint; 1998; ISMRM; p. 0688.

Melchert, U. H., et al.; Motion-Triggered Cine MR Imaging of Active Joint Movement; 1992; MRI; 10; pp. 457-460.

Muhle, C., et al.; Kinematic CT and MR imaging of the patellofemoral joint; 1999; Eur. Radiol.; 9; pp. 508-518.

Niitsu, M., et al.; Tears of Cruciate Ligaments and Menisci: Evaluation with Cine MR Imaging; 1991; Radiology; vol. 178; pp. 859-864.

Pekar, V., et al.; Deformable Image Registration by Adaptive Gaussian Forces; 2004; ECCV; pp. 317-328.

Philips' new Panorama 1.0T a triumph in MR system design; 2004; Field Strength; Issue 24.

Shellock, F. G., et al.; Kinematic MR Imaging of the Patellofemoral Joint: Comparison of Passive Positioning and Active Movement Techniques; 1992; Radiology; pp. 574-577.

Van Sint Jan, S., et al.; Joint Kinematics Simulation from Medical Imaging Data; 1997; IEEE Trans. On Biomedical Engineering; 44(12)1175-1184.

\* cited by examiner

USER INTERFACE FOR MOTION ANALYSIS IN KINEMATIC MR STUDIES

CROSS REFERENCE TO RELATED APPLICATIONS

This application claims the benefit of U.S. provisional application Ser. No. 60/648,033 filed Jan. 28, 2005, which is incorporated herein by reference.

The present invention relates to the diagnostic imaging arts. It finds particular application in conjunction with the magnetic resonance imaging of movable joints in open magnet magnetic resonance imaging (MRI) systems and will be described with particular reference thereto. However, it is to be appreciated that the present invention is applicable to magnetic resonance imaging systems, computed tomography imaging systems, ultrasound and the like for a variety of imaging applications.

The ability to inspect moving joints, such as a knee, elbow, shoulder, etc., is important for diagnostic purposes. In recent years, MRI has been used for imaging of movable joints or other moving structures. Motion during data acquisition causes the resultant image to be blurred. Acquiring a full volume data set is sufficiently time consuming (e.g. a minute or more) such that moving anatomical structures typically do not remain in substantially the same position for the MRI data acquisition time.

Some cyclically moving organs, such as the heart, consistently follow the same pattern of movement. This enables the acquired data to be sorted by cardiac phase. Over several cardiac cycles, complete data sets can be acquired for each of a plurality of cardiac phases. The images which are reconstructed for each phase represent an average over the several cardiac cycles.

Some moving anatomical structures do not have such a predictable cycle. Sorting data by position is difficult. Further, many movable anatomical structures are subject to patient movement. When a joint is repeatedly flexed, the patient will tend to move the joint in space, i.e. partially in and out of the imaging volume. Constraining the joint with braces or other mechanical constraints interferes with natural movement, potentially eliminating the aspect of free flexing that the diagnostician is attempting to image.

Many approaches for viewing the moving anatomical structures are based on fast 2D imaging, which limits the study to a single imaging plane. Portions of the imaged anatomy move in and out of the plane during joint flexing or other movement. In order to keep the anatomy of interest in the imaging plane, the joints are restrained with restraining devices. The restraining of joints limits the freedom of movement which is not desirable in kinematic studies.

Another approach is to acquire a series of n 3D images of the joint, each with the joint held stationary in a different degree of flexation. If the joint is unrestricted, the patient moves from image to image. Due to this movement, a slice in one image may correspond to different slices in other images. Further, the patient may move in directions other parallel to the imaging coordinate system causing skewing of the image planes. Slice-by-slice viewing of the 4D images is cumbersome, and does not allow easy appreciation of the movement. Simply presenting corresponding slice data in a cine-loop is compromised by through-plane displacements of anatomy and "jerks" between frames, both of which obstruct visual analysis of the movement.

The present application contemplates a new and improved method and apparatus which overcomes the above-referenced problems and others.

In accordance with one aspect of the present invention, an apparatus for diagnostic imaging is disclosed. A memory stores a plurality of 3D images, each 3D image depicting a common anatomical region of interest of a subject with portions of the subject anatomy differently positioned in each of the 3D images. A processor fixes a designated anatomical component in each of the consecutive 3D images. A video processor displays viewing planes of the 3D images in a cine format, in which the designated anatomical component remains fixed in each consecutive 3D image while other portions of the anatomical region move relative to the designated anatomical component.

In accordance with another aspect of the present invention, a method of diagnostic imaging is disclosed. A plurality of 3D images are stored in a memory, each 3D image depicting a common anatomical region of interest of a subject with portions of the subject anatomy differently positioned in each of the 3D images. A designated anatomical component is fixed in each of the consecutive 3D images. Viewing planes of the 3D images are displayed in a cine format, in which the designated anatomical component remains fixed in each consecutive 3D image while other portions of the anatomical region move relative to the designated anatomical component.

One advantage of the present invention resides in viewing the motion of any anatomy from any perspective.

Another advantage resides in interactively defining a region of interest of the patient which remains fixed in the viewing plane during the movement of other portions of the anatomy.

Another advantage resides in real time user's interaction in the viewing plane.

Still further advantages and benefits of the present invention will become apparent to those of ordinary skill in the art upon reading and understanding the following detailed description of the preferred embodiments.

The invention may take form in various components and arrangements of components, and in various steps and arrangements of steps. The drawings are only for purposes of illustrating the preferred embodiments and are not to be construed as limiting the invention.

Figure 1:
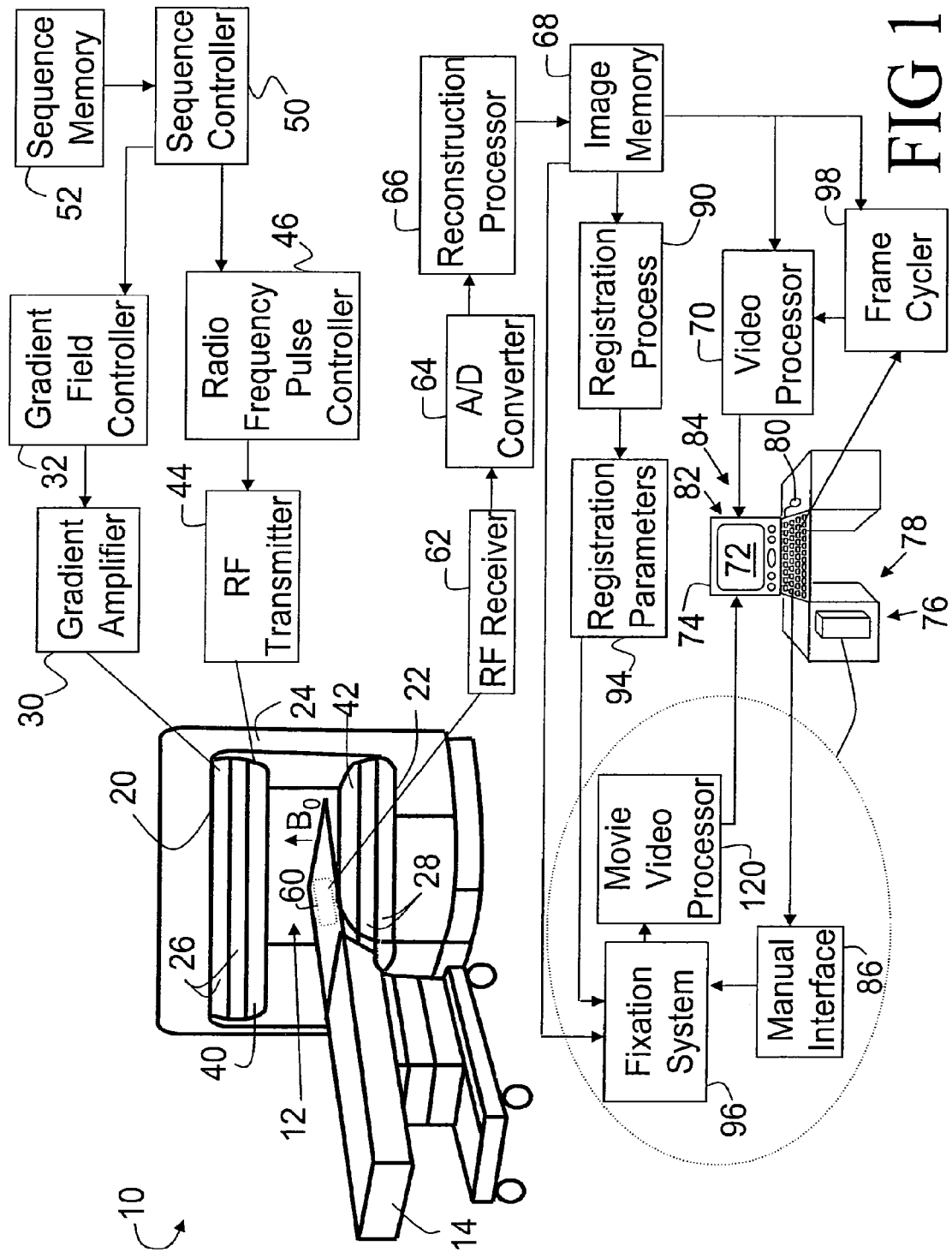
FIG. 1 is a diagrammatic illustration of a diagnostic imaging system.

With reference to FIG. 1, a magnetic resonance imaging scanner 10 performs magnetic resonance imaging in an imaging region 12. In the illustrated embodiment, the scanner has an open bore that facilitates interventional medical procedures. It will be appreciated that the scanner 10 is an example only, and that the methods and apparatuses described herein are generally applicable in conjunction with substantially any type of magnetic resonance imaging scanner, including but not limited to open bore scanners, closed-bore scanners, vertical bore scanners, and so forth, as well as to other types of diagnostic imaging. An imaging subject (not shown), such as a human medical patient, is placed on a subject support 14 and positioned within the imaging region 12 of the scanner 10.

With continuing reference to FIG. 1, the imaging region 12 is defined between pole pieces 20, 22. The pole pieces 20, 22 are interconnected by a ferrous flux path 24, such as a C, double-C, U-shaped or the like iron element. In one embodiment, the iron element 24 is a permanent magnet which causes a vertical $B_0$ magnetic field between the pole faces across the imaging region 12. Alternately, resistive or superconducting electrical windings are provided for inducing the magnetic flux in the ferrous flux path 24 and the field $B_0$ across the pole faces. Passive or active shims are disposed at the pole pieces 20, 22 or in the ferrous flux path 24 adjacent the pole pieces 20, 22 to render the vertical $B_0$ field more linear across the imaging region 12.

Magnetic field gradient coils 26, 28 are disposed at the pole pieces 20, 22. Preferably, the gradient coils 26, 28 are planar coil constructions which are connected by gradient amplifiers 30 to a gradient magnetic field controller 32. The gradient magnetic field controller 32, as is known in the art, provides current pulses which are applied to the gradient coils such that gradients in the uniform magnetic field are created along the longitudinal or z-axis, the vertical or y-axis, and the transverse or x-axis.

In order to excite magnetic resonance in dipoles of the imaging subject disposed in the imaging region 12, radio frequency coils 40, 42 are disposed between the gradient coils 26, 28 and the imaging region 12. A radio frequency transmitter 44, preferably a digital transmitter, causes the radio frequency coils 40, 42 to transmit radio frequency pulses requested by a radio frequency pulse controller 46 to be transmitted into the imaging region 12. A sequence controller 50, under operator control, retrieves an imaging sequence from a sequence memory 52. The sequence controller 50 provides the sequence information to the gradient controller 32 and the radio frequency pulse controller 46 such that radio frequency and gradient magnetic field pulses in accordance with the selected sequence are generated.

Preferably, one or more radio frequency surface coils or local coils 60 are disposed along a region of interest of the subject. Alternately, the radio frequency coils 40, 42 are used in both transmit and receive modes. Similarly, the local coil 60 can be used as both a radio frequency transmitter and receiver. The surface coil(s) 60 is connected with one or more radio frequency receiver(s) 62 to demodulate the radio frequency resonance signals received by the built-in and/or removable radio frequency coils. Signals from the receiver(s) 62 are digitized with an array of analog-to-digital converters 64 and processed by a reconstruction processor 66 into volumetric image representations which are stored in a volumetric image memory 68. A video processor 70, under operator control, withdraws selected image data from the volumetric memory 68 and formats it into appropriate format for display on one or more human-readable displays 72, such as a video monitor, active-matrix monitor, liquid crystal display, or the like.

A user manipulates the displayed slices using a workstation 74 which includes a CPU processor or hardware means 76 and a software means 78 for carrying out the necessary image processing functions and operations. The workstation 74 preferably includes one or more input devices 80 by the use of which the user can selectively control the workstation 74 and/or the scanner 10. Preferably, the workstation 74 includes a user interface 82 which allows viewing of motion of an anatomical region from any perspective. The user interface 82 includes a viewer 84 which allows the inspection of 4D data sets; e.g. by three orthogonal viewing perspectives. The user, via the input means 80 and a manual interface or means 86, can navigate through the data sets by translation and rotation, to scale the data set, and to manipulate window and level of the grey values.

Figure 2:
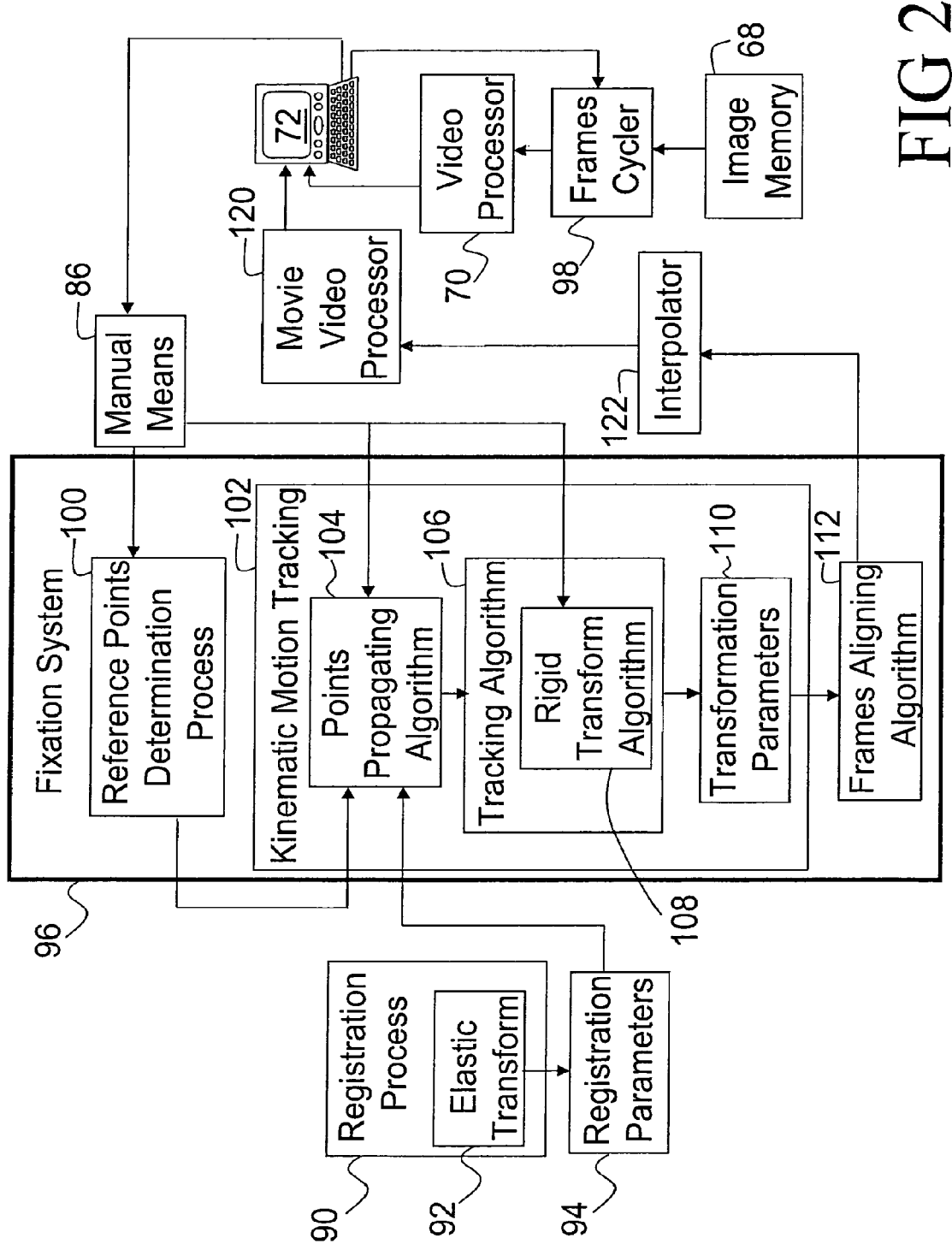
FIG. 2 is a diagrammatic illustration of a detailed portion of the diagnostic imaging system.

With continuing reference to FIG. 1 and further reference to FIG. 2, imaging conditions might in some way change between the acquisition of the data for each of the 3D images such that each of the 3D images may be in some way distorted, shifted, or rotated relative to others. In one embodiment, a registration means or process 90 determines registration transforms or parameters that bring each of the 3D images into a common registration. An elastic registration algorithm 92 determines misalignment in each of the 3D images between landmarks, such as fiducial markers, distinguished anatomical structures, etc., caused by non-rigid motions and determines closed-form elastic transformations which register or realign the misaligned landmarks. More specifically, the closed-form Gaussian elastic transformation uses the Gaussian-shaped forces centered at the positions of the landmarks to elastically deform the images in a way that the prescribed landmark correspondences (displacements) are preserved. These elastic transforms or other registration parameters are stored in a registration parameters memory 94.

A fixation system or means 96 allows the fixation of any user-defined object or region by image post processing. The user, through the keyboard or other input device 80 controls a frame cycler 98 which causes the video processor 70 to withdraw and display one or more selected frames from the image memory 68 on the monitor 72. A reference points determining means or process 100 defines a set of reference points $P \subset R^d$ (d=2, 3) in a first frame. In one embodiment, the user interactively defines the reference points by clicking with the mouse 80 on three or more characteristic appropriate points lying in a selected viewing plane on a structure that is selected to remain stationary in subsequent CINE images. Alternatively, the reference points are selected automatically. For example, a scan protocol for a given region specifies the bone or other structure to remain stationary. An automatic segmentation routine segments the designated bone in at least one of the 3D images. Three or more characteristic reference points on the segmented bone are automatically selected.

A kinematic motion tracking algorithm or means 102 calculates transformations between the selected reference points in each of the n 3D images planes. A points propagating algorithm or means 104 calculates the movement of the anatomical structure in each subsequent frame. More specifically, the points propagating algorithm 104 tracks the motion of the determined reference points $P \subset R^d$ of the frame into the subsequent frame by using calculated elastic registration parameters from registration parameters memory 94 to assure that the reference points are coplanar and have the same relationship in each 3D image. The reference points P are advected along the motion field to approximate new positions $M(p) \in R^d$ in each consecutive frame. A tracking algorithm or means 106 calculates the tracking of the object or region of interest preferably using rigid point-based registration of each of the n sets of reference points. More specifically, a transform algorithm or means 108 computes a rigid transformation $T_n$ between the reference points in the first and the $n^{th}$ 3D image using a singular-value decomposition algorithm, which minimizes the sum of the squared distances between T(p) and M(p) for all p∈P:

$$\operatorname*{argmin}_{T \text{ rigid}} \sum_{p \in P} d(T(p), M(p))^2,$$

where
T(p) is a rigid transformation of a reference point p, and
M(p) is a new position of a reference point p.

In this manner, the motion tracking algorithm finds the points on the structures in each of the n 3D images which correspond to the points in the first frame that were marked with the reference points. Once the corresponding points are found in each of the n images, the transform algorithm finds the transforms $T_1, \ldots, T_{n-1}$, which define movement of the reference points from the initial image slice to the locations in a corresponding slice in each of the other 3D images.

The determined transformation parameters are stored in a transformation parameters memory 110.

A frames aligning algorithm or means 112 transforms the corresponding slices or frames from each of the 3D images such that the defined objects or regions of interest remain stable when presented in cine loop by using the inverse of the transformation defined by the rigid transform means 108. E.g., each transformation T is used to predict the coordinate system of the new viewing plane T(V) from a previous viewing plane V. That is, the application of the inverse transforms of $T_1, \ldots, T_n$ to the corresponding image extracts the slice and the coordinate system, which show a minimal relative motion of the reference points. Further, the inverse transforms translate and rotate each corresponding slice such that the reference points have the same position and orientation in each displayed frame. In this manner, applying the kinematic movie algorithm 102 to all consecutive frames creates a movie in which a marked structure remains fixed in the viewing plane for all cine frames while the rest of the anatomy moves relative to the fixed structure.

A movie video processor 120 represents the 4D kinematic data set in cine mode. As the user interactively navigates through the data sets via the input and manual means 80, 86 on the user interface 82, the movie video processor 120 formats the data such that the marked anatomical region of interest remains stable in all consecutively displayed images. E.g., the combination of image transformations is applied to each of n 3D data sets, showing the stabilized region of interest in the defined viewing perspective in cine mode. Every user interaction concerning viewing aspects is reflected immediately.

Depending on the amount of relative motion between the acquisition of each of the n 3D images, the motion in the cine display may be jerky. Preferably, an image interpolator 122 interpolates the n frames to smooth the displayed motion.

In one embodiment, the user-interface 82 for motion compensation is used within the acquisition loop of the MR-scanner. On the console of the MR-scanner, the user-interface 82 is used to dynamically select a viewing plane by selecting landmarks in the first frame. Then the motion is estimated by acquiring additional data in the spatial vicinity of the specified landmarks. If the landmarks for motion compensation are automatically computed, then, at least a protocol for a specific organ, bone or joint needs to be selected. Although described with reference to an MRI imaging device, it is to be appreciated that this technique can be used with a series of stepped motion images from any of a variety of imaging modalities.

The invention has been described with reference to the preferred embodiments. Modifications and alterations will occur to others upon a reading and understanding of the preceding detailed description. It is intended that the invention be construed as including all such modifications and alterations insofar as they come within the scope of the appended claims or the equivalents thereof.

The invention claimed is:

1. A diagnostic imaging apparatus comprising:
a memory, which stores a plurality of 3D images, each 3D image depicting a common anatomical region of interest of a subject with portions of the subject anatomy differently positioned in each of the 3D images, a first of the 3D images having reference points which define a designated anatomical component;
one or more processors programmed to:
calculate a propagation of the reference points from the first 3D image into other 3D images;
define transforms which describe the propagation of the reference points between 3D images;
apply inverses of the transforms to the 3D images to define a series of frames; and
display viewing planes of the 3D images in a cine format, in which frames the anatomical component defined by the reference points in each of the 3D images remains fixed while the other portions of the anatomical region of interest move relative to the fixed designated anatomical component.

2. The apparatus as set forth in claim 1, further including:
a registration processor which registers corresponding points in each pair of consecutive 3D images, the registration processor including:
an elastic transform algorithm which determines an elastic transform representative of misalignment of the data points in each two consecutive 3D images.

3. The apparatus as set forth in claim 2, wherein the propagation calculating algorithm operates on each two consecutive 3D images in accordance with the determined elastic transform.

4. The apparatus as set forth in claim 1, wherein the transform defining algorithm includes:
a rigid transform algorithm which determines a rigid transform representative of misalignment of the reference points of each two 3D images.

5. The apparatus as set forth in claim 4, wherein the aligning algorithm operates on the viewing planes of the consecutive 3D images in accordance with the determined rigid transform to align consecutive viewing planes with one another.

6. An apparatus for diagnostic imaging comprising:
a memory, which stores a plurality of 3D images, each 3D image depicting a common anatomical region of interest of a subject with portions of the subject anatomy differently positioned in each of the 3D images;
an anatomical component processor for fixing a designated anatomical component in each of the consecutive 3D images, a viewing plane of the designated anatomical component being designated by at least three coplanar reference points on the designated anatomical component, the anatomical component processor further including:
a kinematic motion tracking algorithm which tracks the reference points through the plurality of 3D images and determines transforms descriptive of changes in positions of the reference points in the 3D images; and
a video processor for displaying viewing planes of the 3D images in a cine format, in which the designated anatomical component remains fixed in each consecutive viewing plane image while other portions of the anatomical region move relative to the designated anatomical component.

7. The apparatus as set forth in claim 6, further including:
a frame alignment processor which operates on the 3D images in accordance with the transforms to extract and transform corresponding viewing planes from each 3D image, which viewing planes are translated and rotated such that the reference points are each in a common position in the transformed viewing planes which are communicated to the video processor.

8. The apparatus as set forth in claim 7, further including:
an image interpolator for interpolating the extracted and transformed viewing planes to smooth movement of the other portions of the anatomical region relative to the designated anatomical component on a viewing display.

9. A diagnostic imaging method comprising:
storing a plurality of 3D images in a memory, each 3D image depicting a common anatomical region of interest of a subject with portions of the subject anatomy differently positioned in each of the 3D images;
selecting a set of reference points in a first of the 3D images, the reference points defining the designated anatomical component;
calculating a propagation of the selected reference points from the first 3D image into other 3D images;
defining transforms which describe the propagation of the reference points between 3D images;
applying inverses of the transforms to the 3D images to define a series of frames for display;
displaying the frames in a cine format in which frames the designated anatomical component defined by the reference points in each of the 3D images remains fixed while the other portions of the anatomical region of interest move relative to the fixed designated anatomical component.

10. The method as set forth in claim 9, further including:
registering corresponding data points in each pair of consecutive 3D images with an elastic transform.

11. The method as set forth in claim 10, wherein the step of propagation calculation includes:
applying the elastic transform in determining the propagation of the reference points.

12. The method as set forth in claim 9, wherein defining transforms includes:
determining a rigid transform representative of misalignment of the reference data points in each two consecutive 3D images.

13. The method as set forth in claim 12, further including:
operating on two consecutive 3D images in accordance with the determined rigid transform to align the frames of the consecutive 3D images.

14. A method of displaying images including:
storing a plurality of 3D images in a memory, each 3D image depicting a common anatomical region of interest of a subject with portions of the subject anatomy differently positioned in each of the 3D images;
fixing a designated anatomical component in each of the consecutive 3D images;
designating a viewing plane of the designated anatomical component by at least three coplanar reference points on the designated anatomical component;
tracking the reference points through the plurality of 3D images;
determining transforms descriptive of a change in positions of the reference points in the 3D images; and
displaying viewing planes of the 3D images in a cine format.

15. The method as set forth in claim 14, further including:
selecting another common viewing plane in all 3D images; and
applying the determined transforms to align and transform the another common viewing planes.

16. A non-transitory computer readable medium storing a computer program to perform the method of claim 9.

17. A diagnostic imaging system which includes a user interface for motion analysis in kinematic studies of movement of anatomical components in an anatomical region of a subject, which moving anatomical components move relative to a selected anatomical portion designated by reference points selected on the user interface in one of a plurality of 3D images, the user interface programmed to:
kinematically track the selected reference points in each consecutive 3D image of the plurality of 3D images;
determine transforms descriptive of changes in positions of the reference points in the plurality of 3D images;
with the determined transforms, align viewing planes of the consecutive 3D images with one another in accordance with the determined relative position of each reference point; and,
translate the viewing planes such that the selected anatomical portion has a common position and orientation in the viewing planes of the 3D images.

18. The method as set forth in claim 14, wherein the designated anatomical component remains fixed in each consecutive viewing plane while other portions of the anatomical region move relative to the designated anatomical component.

19. A non-transitory computer readable medium storing a computer program to perform the method of claim 14.

* * * * *